July 20, 1926.  
E. J. GODFREY  
1,592,826  
ARTICLE OF HAND BAGGAGE AND METHOD OF MAKING THE SAME  
Filed July 12, 1920  4 Sheets-Sheet 1
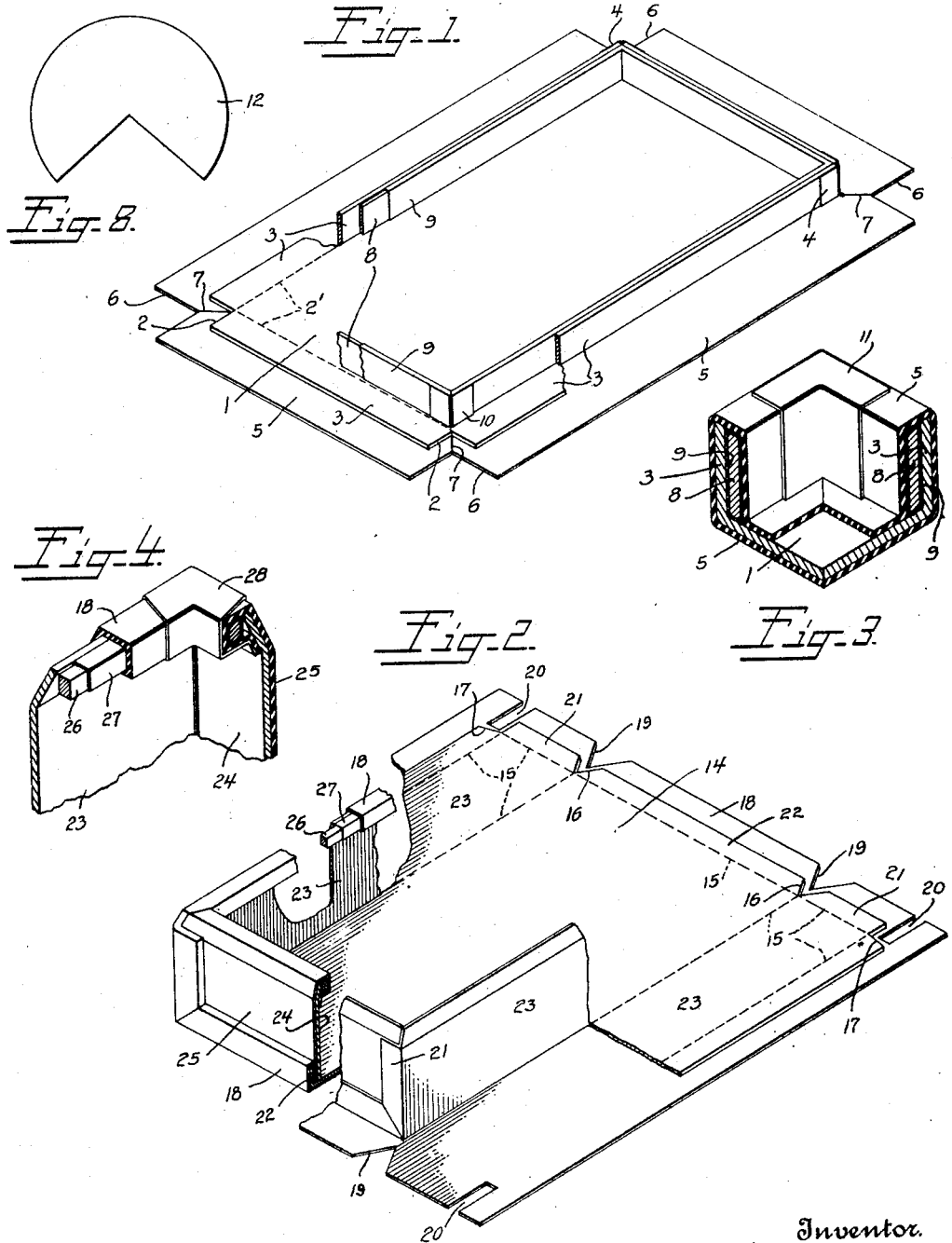
Inventor.  
Edward J. Godfrey,  
By his Attorney.

July 20, 1926.
E. J. GODFREY
ARTICLE OF HAND BAGGAGE AND METHOD OF MAKING THE SAME
Filed July 12, 1920  4 Sheets-Sheet 2
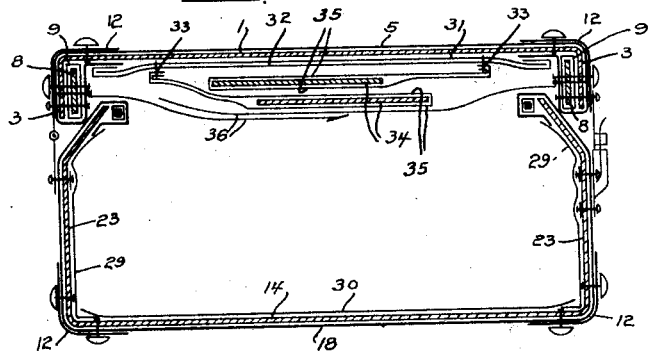
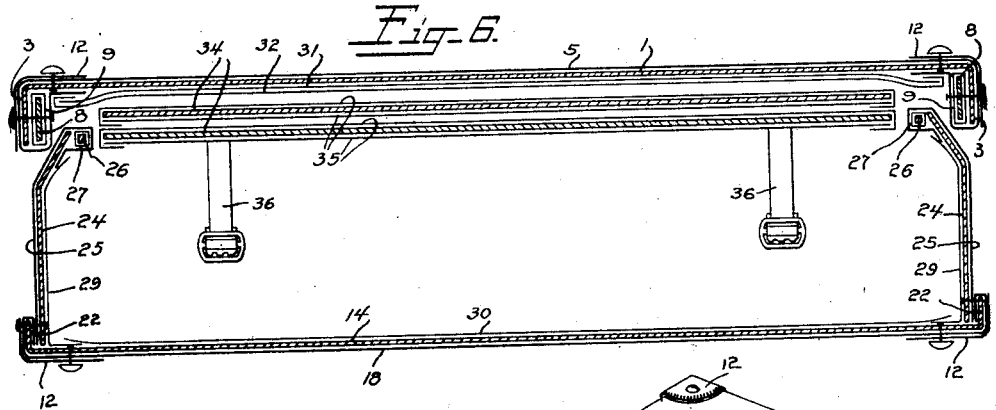
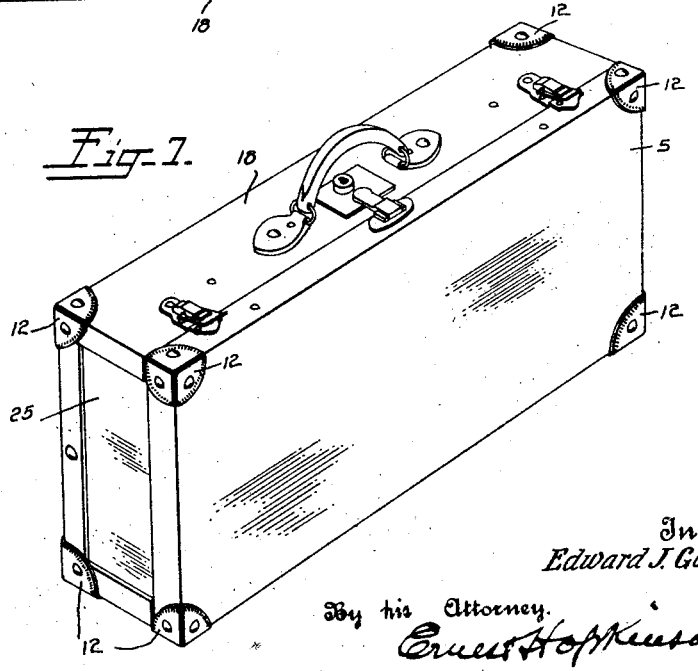
Inventor.
Edward J. Godfrey,
By his Attorney.

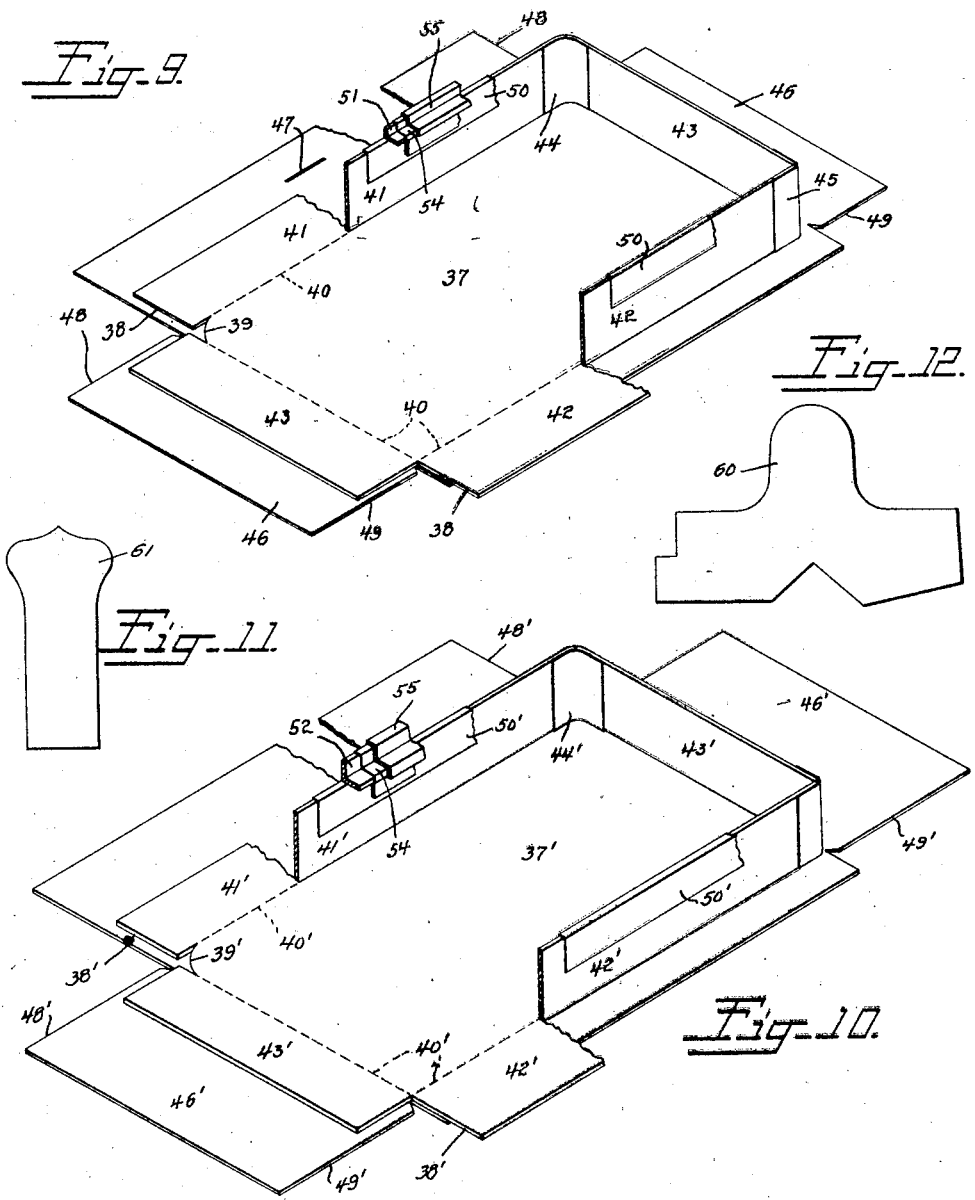

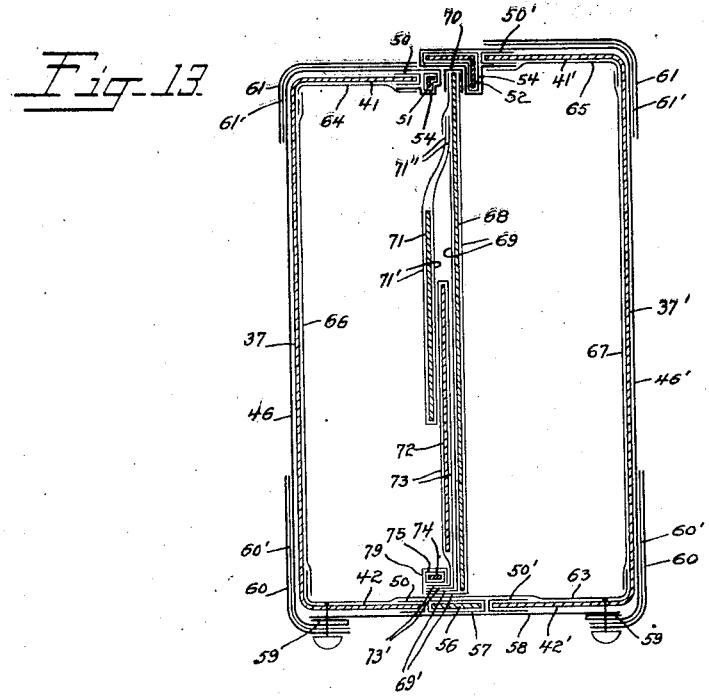
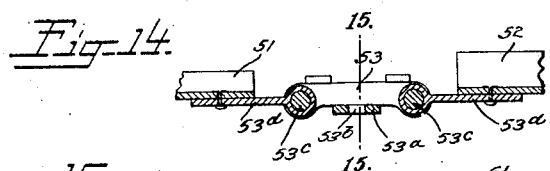
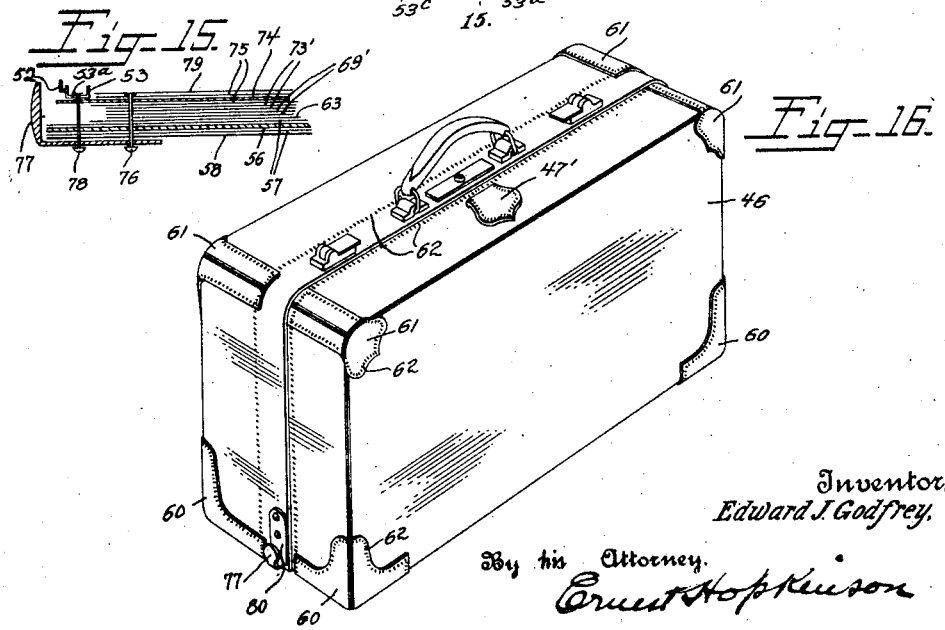

Patented July 20, 1926.

1,592,826

UNITED STATES PATENT OFFICE.

EDWARD J. GODFREY, OF NAUGATUCK, CONNECTICUT, ASSIGNOR TO THE GOODYEAR'S METALLIC RUBBER SHOE COMPANY, A CORPORATION OF CONNECTICUT.

ARTICLE OF HAND BAGGAGE AND METHOD OF MAKING THE SAME.

Application filed July 12, 1920. Serial No. 395,649.

This invention relates to articles of hand baggage of the types generally known as suit cases, Gladstone bags, overnight cases, etc., more particularly to articles of this character made of vulcanizable material and to the method of making the same.

Hand baggage of this character is usually subjected to a great deal of abuse, either by overloading or by severe handling in transit, or by both. Hence, in order to stand up under the strain to which they are subjected, it has been previously necessary to make such articles of high grade sole leather and other first class materials, using great care and expert workmanship. As a result, cases and bags of this character are very expensive. Cheaper articles are also made, either by using thin and poor grade leather or by using imitations thereof, but the cheaper articles quickly become worn, the outer covering frequently tears, and they sometimes even burst open when overloaded. The cheaper articles are also lacking in the good appearance of the more expensive ones. In addition, such cases and bags as previously made are not waterproof, and in the case of the cheaper ones a thorough wetting will frequently cause them to come apart.

An object of my invention is to provide a strong, durable, waterproof, and relatively inexpensive article of hand baggage of good appearance.

Another object of my invention is to provide an article of hand baggage in which the use of mechanical fastenings for the parts is substantially eliminated.

Still another object is to provide a reinforced article of hand baggage formed of vulcanizable material, the parts of which are integrally united by vulcanization.

A further object is to provide a simple and rapid method of making such articles.

For a full and complete disclosure of the invention reference is had to the accompanying specification and drawings, in which latter Fig. 1 is a broken away perspective illustrating the manner in which a suit case lid is built up.

Fig. 2 is a similar perspective showing the manner in which the body of the suit case is built up.

Fig. 3 is a detail perspective, partly in section, of the lid structure.

Fig. 4 is a similar detail perspective of the body structure.

Fig. 5 is a transverse diagrammatical section through the suit case.

Fig. 6 is a longitudinal diagrammatical section.

Fig. 7 is a perspective of the finished suit case.

Fig. 8 is a plan of a corner reinforcement.

Fig. 9 is a broken away perspective illustrating the manner in which the smaller or tab section of a Gladstone bag is built up.

Fig. 10 is a similar perspective of the other section of the bag.

Figs. 11 and 12 are plans of corner reinforcements used in the bag.

Fig. 13 is a transverse diagrammatical section through the bag.

Fig. 14 is a central longitudinal section through the hinge member of the bag frame.

Fig. 15 is a detail diagrammatical section through a finished bag taken on a line corresponding to the line 15—15 of Fig. 14, and Fig. 16 is a perspective of the completed bag.

Referring to Fig. 1 of the drawings, the numeral 1 represents a sheet of tar board or other suitable material which forms a reinforcement for the lid member of the suit case. This sheet is formed with cut-outs 2 at the corners, and may be scored along the lines 2' in order to facilitate bending of the material. The sheet 1 is coated with cement on both sides and its side walls 3 formed by bending along the lines 2', the bent up side walls being joined at the corners by strips 4 of friction stock. The lid reinforcement is then laid on a sheet of outer covering material 5 in about the position shown in Fig. 1, the sheet 5 having been previously cemented on the side adjacent the reinforcement. This sheet of outer covering material is preferably formed by coating a good grade of twill or other suitable fabric on its inner side with a vulcanizable composition and on its outer side with a heavier coat of a vulcanizable composition of such toughness and durability as to properly withstand the wear and tear to which it is subjected, and the material may be embossed in imitation of any desired leather grain or other pattern. The sheet of covering material is formed with cut-outs 6 at the corners, and is slit as shown at 7 adjacent the inner end of each cut-out. A reinforcing frame is next applied, said frame consisting of a strip 8 of sheet steel or other suitable material covered with friction stock 9 and bent into a rectangular form, the ends of the frame being joined by a strip 10 of friction stock or in any other desired manner. The reinforcing frame is of the same height as the walls 3 and of a size to fit snugly within said walls, and the friction stock 9 is coated with cement before the frame is placed within the lid. The side edges of the outer cover sheet 5 are next folded in over the walls 3 and reinforcing frame and carefully rolled down, and corner reinforcements 11 of gum stock applied to the inner corners, while somewhat heavier reinforcements 12, also of gum stock, are applied to the outer corners. This completes the assembly of the cover or lid portion of the suit case.

The reinforcement for the body member of the suit case consists of a sheet 14 of tar-board or other suitable material, which may be scored along the lines 15 to facilitate bending and is formed at each end with the intermediate cut-outs 16 and corner cut-outs 17. The sheet 14 is cemented on both sides and superposed on the inner cemented side of a sheet 18 of the outer covering material, which latter is cut out at each end as shown at 19 and 20. The end flanges 21 and 22 formed by the transverse scoring lines 15 are bent up and the outer covering material folded in on them and rolled down, and the side walls 23 are bent up on the inner longitudinal scoring lines 15. The end walls are then put in place, each wall being formed from a sheet 24 of tar board to which a sheet 25 of the outer covering material has been cemented, said outer sheet 25 being aligned with the side and bottom edges of sheet 24 but extending above its top edge. The end wall flanges 21 and 22 are then cemented to the end walls, and light tacks may be temporarily driven through them to hold the parts together until after vulcanization. The edges of the side walls 23 are bent inwardly slightly along the outer longitudinal scoring lines 15, and the edges of the end walls are also bent in in a similar manner. A reinforcing frame is next applied to the body. This frame preferably consists of an endless piece 26 of steel rod or other suitable material bent to a rectangular shape and of a size slightly less than the body of the suit case, said frame being covered with friction stock 27 and the latter coated with cement. The frame is set in the body of the suit case substantially flush with the upper edges of the side and end walls as shown in Figs. 2 and 4, and the upper edges of the outer covering material 18 and 25 folded in over the frame and carefully rolled down. Corner reinforcements 28 of gum stock are next applied to the corners of the body which fit within the lid portion, while the exterior corners are covered with a heavier reinforce 12 of gum stock similar to those used on the lid portion.

The body and lid portions are next varnished in any desired manner and cured. The cured body and lid are then hinged together and the usual hardware, such as a handle, lock, clasps and corner stud applied, and the linings and flaps put in. The body is lined by cementing a strip 29 of frictioned lining material around the inner sides of the case, and a sheet 30 of the same material is cemented to the bottom. The cover is lined by cementing therein a sheet of stiff paper 31 covered on one side by a sheet of frictioned lining material 32, a pair of flaps being stitched to the paper and lining as shown at 33 previous to the insertion of the lining in the lid. Each flap consists of a strip 34 of cardboard covered by a doubled over strip 35 of the frictioned lining material, the frictioned surfaces of said lining material being rolled together where they project beyond the cardboard 34 and stitched to the lining 32 at 33 as before stated. Straps 36 are also riveted through the lid portion.

In Figs. 9 to 16 a Gladstone bag and the method of building it up are illustrated. In general, the construction is somewhat similar to that of the suit case, a sheet 37 of tar board or other suitable reinforcing material being provided (Fig. 9), this sheet having cut-outs 38 at its corners and additional curved cut-outs 39 adjacent the cut-outs 38 in the top edge, and it may be scored along the dotted lines 40 in order to facilitate bending when forming the side and end walls. The sheet 37 is coated with cement on both sides and the respective side and end walls 41, 42 and 43 formed by bending up the edges of the sheet on the lines 40. The side and end walls 41 and 43 are joined along the line of the curved cut-outs 39, rivets, stitching or other means being provided to connect their edges, and strips 44 of friction stock are placed over the inside of the joints. The side and end walls 42 and 43 are joined at right angles and strips 45 of friction stock placed over the outside of the joints. The reinforce member 37 is then disposed on a cemented sheet 46 of the outer covering material in about the position shown in Fig. 9. As the construction so far described is to form the tab section of the bag the sheet 46 is slit at 47 and the tab 47′ (see Fig. 16) is inserted in the slit. This tab may be formed by layers of the outer cover material disposed on each side of an inner rag stock reinforcement. Cut-outs 48 of the shape shown in Fig. 9 are formed in the upper corners of the sheet 46, while smaller cut-outs 49 are formed in the lower corners. A binding 50 of friction stock may then be placed around the edges of the four walls.

In Fig. 10 the manner of building up the complementary section to the tab section is shown, which is similar in all respects to that employed in the tab section, the only difference being that as the tab section is to telescope into it, it is made of slightly larger cross sectional dimensions. The same reference numerals with a prime affixed are applied to corresponding parts of the complementary section.

The two sections are then ready for the application of the hinged frame. This frame consists of two U-shaped members 51 and 52 made of angled steel and connected at their ends by double hinge or pivot members (see Figs. 9, 10 and 14). Each hinge member comprises two spaced parallel bars 53 joined at their middle portions by a bottom transverse bridge or bar 53$^a$, which latter is provided with a rivet receiving opening 53$^b$. Extending through the bars 53 at each end is the pin 53$^c$ in which is hingedly mounted the hinge leaf 53$^d$. The above described hinge member is a standard article in the trade and forms no part of the invention. The smaller U-shaped member 51 is of a size to fit over the upper side and end walls of the tab section, while the larger member 52 is of a size to fit over the upper side and end walls of the complementary section. The frame is covered with friction stock 54 and the latter cemented, the sections of the bag placed with their bottom walls 42 and 42' parallel and spaced apart about the distance between the pivots of the hinge member, and the frame superposed on the edges of the upper side and end walls of the bag sections. The parts are then united by folding over and rolling down the corresponding projecting side and end edges of the outer covers of the sections on the respective U-shaped members 51 and 52 as shown at 55 in Figs. 9 and 10. The united sections are then placed in an inverted position on a support or form and the space between the wall members 42 and 42' of the sections is filled by a strip 56 of tar board or other reinforcing material which has been previously covered with friction stock 57 (see Fig. 13). A sheet 58 of the outer covering material is then cemented and rolled down on the walls 42 and 42' and the strip 56, and the lower side edges of the respective outer covering sheets 46 and 46' are doubled under and cemented and rolled down on the sheet 58 as shown at 59. Reinforce members of the shape shown in Fig. 12 are then applied to the lower corners of the bag, each of said members consisting of a piece of gum stock 60 superposed on a piece of friction stock 60', as shown in Fig. 13. In a similar manner reinforce members of the shape shown in Fig. 11 are applied to the upper rounded corners of the bag, said reinforce members also consisting of a piece of gum stock 61 superposed on a piece of friction stock 61'. A stitching tool 70 may then be run over the various parts of the bag as shown at 62 in Fig. 16, in imitation of the sewed connections of a leather bag. This completes the assembly of the bag body, which is then varnished and cured.

After curing the linings and internal fittings are applied. A sheet 63 of frictioned lining material is cemented in over the lower walls 42 and 42' and the strip 56, sheets 64 and 65 of the same material are cemented in around the upper side and end walls of the respective sections, and front and back lining sheets 66 and 67 also cemented in. The partition is next applied, the same consisting of a sheet of cardboard 68 covered on each side with a sheet 69 of the frictioned lining material and bound around the upper and end edges by a strip 70 of the outer covering material. The lower edge portions 69' of the sheets 69 extend beyond the cardboard 68 and are rolled together. Previous to the assembling of the partition a pocket and flap are secured to one of the sheets 69. The flap consists of a sheet 71 of cardboard around which a sheet 71' of the frictioned lining is doubled, the ends 71'' of the lining sheet being rolled together and inserted in a horizontal slit in the sheet 69. The pocket wall is formed by a sheet 72 of cardboard around which a sheet 73 of the frictioned lining is doubled, the projecting side portions of the sheet 73 being rolled together and inserted in vertical slits in the sheet 69, while the projecting lower edge portions 73' of the sheet 73 are also rolled together and superposed on the edge portions 69'. The edge portions 69' and 73' are disposed on the lining 63 above the filler strip 56 and a securing strip 74 of steel or other suitable material covered with friction stock 75 is disposed on top of said edges, rivets 76 (see Fig. 15) being clinched through the parts at intervals along the strip 74, in order to securely hold the parts together. At each end of the bag a guard member 77 is provided for the adjacent hinge member, said guard member being secured in position by a rivet 78 passing through the guard member, the filler strip the steel strip 74 and the hinge member 53. An end rivet 76 on each side may also be passed through the guard member 77. A strip 79 of the frictioned lining material is then cemented over the friction covered strip 74. A guard member 80 is also riveted to the frame 52 adjacent the point where it moves in and out of the guard 77, and the guards 77 and 80 are preferably formed of a material to match the rest of the hardware employed in the bag. The bag is then finished by applying the usual hardware, such as a handle, lock, clasps, and bottom studs.

Over-night cases, ladies' vanity cases, and similar articles of hand baggage may be built in the same manner as that employed for the suit case and Gladstone bag.

It will be seen that by the method of my invention an article of hand baggage has been provided which is quickly and economically made of preformed parts, is strong, durable, of good appearance, which cannot come apart by the failure of mechanical fastenings, is waterproof, and which when soiled can be easily cleaned by merely applying a moistened cloth.

While specific applications of the invention have been disclosed herein, it is evident that numerous modifications may be made in the structures shown and described and in the method of making them without departing from the spirit of the appended claims.

Having thus described my invention what I claim and desire to protect by Letters Patent is:

1. An article of hand baggage consisting of complementary sections, each comprising a sheet of relatively stiff reinforcing material bent up at its edges to form side walls, a unitary reinforcing frame for the side walls, a sheet of vulcanizable material covering said reinforcing sheet and lapped over said frame to thereby secure the side walls to each other through the frame, outer reinforce members of vulcanizable material for the joints of the side walls, all said parts being integrally united by vulcanization, and a hinged connection between the sections.

2. An article of hand baggage consisting of telescoping sections, each comprising a substantially rectangular inner body of stiff reinforcing material, a hinged frame comprising U-shaped members extending around the edges of the end walls and upper side wall of each section, said members being hinged together between the adjacent edges of the lower side walls of the sections, and an outer covering of vulcanizable material integrally uniting the sections and hinged frame.

3. The method of making hand baggage having hingedly connected complementary sections, which consists in forming the sections by superposing an inner reinforce or body member in sheet form on an outer covering sheet of vulcanizable material, bending up the edges of the sheets and joining them to form the walls of the section, disposing an interior reinforce in each section, joining the same to its section by lapping over the outer covering sheet on the interior reinforce, exteriorly reinforcing the wall joints with vulcanizable material, and vulcanizing to integrally unite the parts.

Signed at Naugatuck this 7th day of July, 1920.

EDWARD J. GODFREY.